United States Patent
Gandhi et al.

(10) Patent No.: US 6,285,980 B1
(45) Date of Patent: Sep. 4, 2001

(54) CONTEXT SHARING OF SIMILARITIES IN CONTEXT DEPENDENT WORD MODELS

(75) Inventors: Malan Bhatki Gandhi, Elk Grove Village; John Jacob, North Aurora, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/184,620

(22) Filed: Nov. 2, 1998

(51) Int. Cl.[7] .......................... G10L 15/14; G10L 15/04; G10L 15/08

(52) U.S. Cl. .......................... 704/256; 704/231; 704/251; 704/255

(58) Field of Search .................................. 704/251, 252, 704/253–256, 9, 10

(56) References Cited

U.S. PATENT DOCUMENTS

| | | | |
|---|---|---|---|
| 4,989,248 | * 1/1991 | Schalk et al. | 704/252 |
| 5,384,893 | * 1/1995 | Hutchins | 704/267 |
| 5,493,606 | * 2/1996 | Osder et al. | 704/258 |
| 5,850,629 | * 12/1998 | Holm et al. | 704/260 |
| 6,055,499 | * 4/2000 | Chengalvarayan et al. | 704/250 |

OTHER PUBLICATIONS

Gandhi, M.B.; Jacob, J. "Natural number recognition using MCE trained inter-word context dependent acoustic models," International Conference on Acoustics, Speech and Signal Processing, May 12–15, 1998.*

PlanIt™ (Media Vision's "User's Guide to the personal daily," Iguana Productions copyright 1993).*

M. K. Brown et al., "A Grammar Compiler For Connected Speech Recognition", *IEEE Transactions On Signal Processing*, vol. 39, No. 1, Jan. 1991 pp. 17–28.

W. Chou et al., "Minimum Error Rate Training Based On N–Best String Models", *ICASSP '93*, pp. II–652–II655.

K. Ma et al., "Scaling Down: Applying Large Vocabulary Hybrid HMM–MLP Methods To Telephone Recognition Of Digits And Natural Numbers", Proceedings Of The 1995 IEEE Workshop On Neural Networks For Signal Processing, V, pp. 223–232.

C. de la Torre et al., "Recognition Of Spontaneously Spoken Connected Numbers In Spanish Over The Telephone Line", European Conference On Speech Communication & Technology, Madrid, Sep. 1995, pp. 2123–2126.

B–H. Juan et al. "The Segmental K–Means Algorithm For Extimating Parameters Of Hidden Markov Models", IEEE Transactions On Acoustics, Speech And Signal Processing, vol. 38, No. 9, Sep. 1990, pp. 1639–1641.

M. G. Rahim et al., "Signal Conditioning Techniques For Robust Speech Recognition", *IEEE Signal Processing Letters*, vol. 3, No. 4, Apr. 1996, pp. 107–109.

(List continued on next page.)

*Primary Examiner*—Richemond Dorvil
*Assistant Examiner*—Daniel Nolan
(74) *Attorney, Agent, or Firm*—J. R. Penrod

(57) ABSTRACT

A natural number recognition method and system that uses minimum classification error trained inter-word context dependent models of the head-body-tail type over a specific vocabulary. One part of the method and system allows recognition of spoken monetary amounts in financial transactions. A second part of the method and system allows recognition of numbers such as credit card or U.S. telephone numbers. A third part of the method and system allows recognition of natural language expressions of time, such as time of day, day of the week and date of the month for applications such as scheduling or schedule inquires. Even though limited natural language expressions are allowed, context sharing between similar sounds in the vocabulary within a head-body-tail model keeps storage and processing time requirements to manageable levels.

22 Claims, 5 Drawing Sheets

OTHER PUBLICATIONS

W. Chou et al., "Minimum Error Rate Training Of InterWord Context Dependent Acoustic Model Units In Speech Recognition", *ICSLP '94*, Yokohama, pp. 439–442.

C. N. Jacobsen et al., "Automatic Recognition Of Danish Natural Numbers For Telephone Applications", *ICASSP '96*, pp. 459–462.

P. Ramesh et al., "Modeling State Durations In Hidden Markov Models For Automatic Speech Recognition", *ICASSP '92*, pp. I–381–I–384.

C. de la Torre et al., "On–line Garbage Modeling For Word And Utterance Verification In Natural Numbers Recognition", *ICASSP '96*, pp. 845–848.

Z. Hu et al., "Speech Recognition Using Syllable–Like Units", *ICSLP '96*, pp. 1117–1120.

P. Jeanrenaud et al., "Spotting Events In Continuous Speech", *ICASSP '94*, pp. I–381–I–384.

\* cited by examiner

CONTEXT SHARING OF SIMILARITIES IN CONTEXT DEPENDENT WORD MODELS

TECHNICAL FIELD

The invention relates to automatic speech recognition and more particularly to a method and apparatus for automatic speech recognition of numbers, times and dates that are spoken in natural language words.

DESCRIPTION OF THE PRIOR ART

In many telephony applications or services that use automatic speech recognition, the ability to recognize numbers is often a major component. Traditionally, recognition of speech input containing numbers has been achieved with high accuracy using isolated or connected digit recognizers. As speech recognition gains visibility and finds a wider range of applications, it is often not feasible to expect users to provide input solely in the form of isolated or connected digits. For example, the number "847" is likely to be spoken as the sequence of digits "eight four seven" in a context such as a U.S. telephone number, but in a different context such as a monetary amount, the same number is more likely to be spoken in a natural way as "eight hundred and forty seven." This latter case is what is referred to as a natural number.

Previously, natural speech has been avoided or curtailed because of processing and system requirements for natural speech recognition systems and processes. In the general category of speech recognition systems, if there are N words in a vocabulary of a task or application, the total number of contexts C that would be needed to be modeled (including the silence model) is $C=\{2.N.(N+1)\}+N+1$. Thus the number of contexts grows primarily as twice the square of the number of words in the vocabulary. According to the previous context equation, a one hundred natural word vocabulary would have over twenty thousand contexts for the model to deal with.

Previous work on natural number recognition can be found in the literature. In "Speech recognition using syllable-like units," by Hu et al. published in Proceedings International Conference on Spoken Language Processing, pp. 1117–1120, 1996, the authors proposed the use of syllable-like units as the basic units of recognition, and tested the approach on a database consisting of the months of the year. Results on spotting a "time of day" event in telephone conversations were reported in an article entitled "Spotting events in continuous speech" published in Proceedings IEEE International Conference on Acoustics, Speech and Signal Processing, pp. 381–384, 1994 authored by Jeanrenaud et al. The concept of head-body-tail models was used for connected digit recognition in the article entitled. "Minimum error rate training of inter-word context dependent acoustic model units in speech recognition," published in Proceedings International Conference on Spoken Language Processing pp. 439–442, 1994 by Chou et al. In the article "Recognition of spontaneously spoken connected numbers in Spanish over the telephone line," published in Proceedings EUROSPEECH-95, pp. 2123–2126, 1995 by Torre et al. the authors found an improvement in Castilian Spanish connected number recognition by using techniques such as tied-state modeling, multiple candidates, spectral normalization, gender modeling, and noise spotting. Similar results on 15 recognition of Danish telephone numbers were reported in an article entitled "Automatic recognition of Danish natural numbers for telephone applications," published in Proceedings IEEE International Conference on Acoustics, Speech and Signal Processing, pp. 459–462, 1996 by Jacobsen and Wilpon.

For automatic speech recognition systems beyond the telephone digit recognition task, three examples of potentially beneficial applications of natural number recognition are recognition of time of day, date, and monetary amounts. Such types of natural number recognition can be used for developing products and services such as schedulers, travel planners, and for banking applications such as bill payments, fund transfers, etc. The vocabularies for these potential applications might be held to a manageable number, but the number of contexts required for context-dependent speech recognition would still be extremely high. Additionally, to make such services usable, this type of recognizer must have a very high string accuracy for input containing spoken natural words.

Thus, there is a need in the art for a method and system for recognizing words spoken in natural language for commercial, monetary and scheduling applications. The method and system must not take excessive amounts of processing time or system assets, yet the recognition accuracy must be high.

SUMMARY OF THE INVENTION

Briefly stated, according to one aspect of the invention, the aforementioned problems are solved and the shortcomings of the art overcome by providing a method for automatic speech recognition. The method includes the steps of: receiving a spoken utterance containing at least one word of a vocabulary of digit words and non-digit words; processing the utterance into cepstral coefficients; separating the utterance into at least one word; separating each word into a head portion, a body portion and a tail portion; recognizing at least one word from the vocabulary using said head portion, said body portion and said tail portion.

In another aspect of the invention, the aforementioned problems are solved and an advance in the art is achieved by providing a method for automatic speech recognition that includes the steps of: receiving an utterance containing at least one word of a vocabulary of digit words and non-digit words; processing the utterance into cepstral coefficients; separating the utterance into at least one word; separating at least one word into a head portion, a body portion and a tail portion; recognizing each word from the vocabulary using said head portion, said body portion and said tail portion. The vocabulary over which the head-body-tail recognition model operates includes a group of time of day words.

In another aspect of the invention, the aforementioned problems are solved and an advance in the art is achieved by providing a method for automatic speech recognition that includes the steps of: receiving an utterance containing at least one word of a vocabulary of digit words and non-digit words; processing the utterance into cepstral coefficients; separating the utterance into a plurality of words; separating at least one of said plurality of words into a head portion, a body portion and a tail portion; recognizing at least one each word from the vocabulary using said head portion, said body portion and said tail portion. The vocabulary of the recognition model includes digit words 'zero', 'oh', 'one', 'two', 'three', 'four', 'five', 'six', 'seven', 'eight', and 'nine'.

In another aspect of the invention, the aforementioned problems are solved and an advance in the art is achieved by providing a method for automatic speech recognition that includes the steps of: receiving an utterance containing at least one digit word and at least one non-digit word; processing the utterance into cepstral coefficients; separating the utterance into a plurality of words; separating at least one of said plurality of words into a head portion, a body portion and a tail portion; and recognizing at least one of said plurality of words using a vocabulary for numbers, date and time of day.

In another aspect of the invention, the aforementioned problems are solved and an advance in the art is achieved by providing a method for automatic speech recognition that includes the steps of: receiving an utterance containing at least one digit word and at least one non-digit word; processing the utterance into cepstral coefficients; separating the utterance into a plurality of words; separating at least one of said plurality of words into a head portion, a body portion and a tail portion; and recognizing at least one of said plurality of words using a vocabulary for numbers, date and time of day. The head-body-tail recognition model of this method also has a second plurality of words that have a plurality of shared contexts.

DETAILED DESCRIPTION

Figure 1:
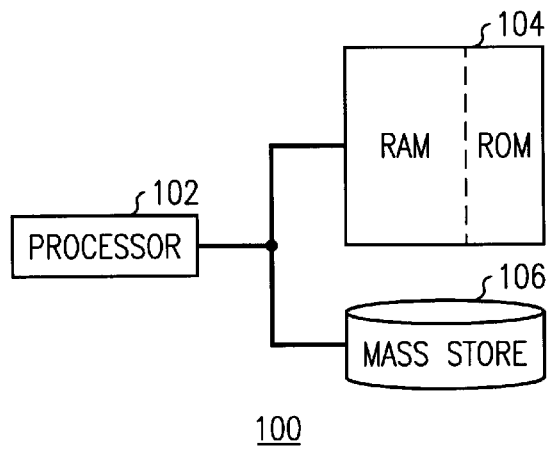
FIG. 1 is a block diagram of a system for use in speech recognition.

Referring now to FIG. 1, a system 100 is shown. The system 100 has a processor 102 connected to a memory 104. Memory 104 has many RAM locations and preferably has a few ROM locations also. System 100 also has mass storage unit 106 for storing large amounts of information that contain program instructions and model information that can be read into or written from memory 104. System 100 may be a stand alone system, or preferably, it may be a speech recognition portion or sub-system of a larger telecommunication system.

The model topology selected for recognition of natural numbers selected after experimenting with different model types is the context dependent head-body-tail (HBT) model. A HBT model for a natural language vocabulary was selected and trained using some available databases of relevant speech samples. For comparison purposes, a context independent whole-word (CIWW) model set was also similarly trained and tested. Both model sets used speaker independent, continuous density left-to-right Hidden Markov Models (HMMs), with varying number of states and mixtures. Training of the models was performed in two steps. The first step involved maximum likelihood (ML) training using the segmental k-means training method similar to that presented by Juang and Rabiner in their article "The segmental K-means algorithm for estimating parameters of hidden markov models" appearing in IEEE transactions on Acoustics, Speech and Signal Processing, Vol. 38, No. 9, pp1639–1641, 1990. This training was followed by iterative discriminative minimum classification error (MCE) training similar to that presented by Chou et al. in their article "Minimum error rate training based on N-best string models", appearing in Proceedings of IEEE International Conference on Acoustics, Speech and Signal Processing, pp. 652–655, 1993. MCE training improves the discriminating ability of the ML training method by considering competing models and minimizing the recognition error rate of the training data. Since the vocabulary of the evaluation data was fixed, this training was termed a task dependent training. Therefore, word recognition was used during MCE training when generating the N-best (N=4 in the preferred embodiment of the invention) competing strings for each utterance. The topology of the model sets is described in greater detail in the description later.

Five databases were used for training the models and they are:

DB 1: This database consists of connected digit strings, ranging in length from 1 to 16 digits, with an average string length of 11.8. This database was collected over the U.S. telephone network through data collection efforts, a live service, and field trials covering many dialectical regions in the United.States. 13,714 strings were used for training.

DB2: The Macrophone Corpus of American English Telephone Speech was collected by SRI and distributed by Linguistic Data Consortium (LDC). The data was collected in 8-bit mu-law digital format over TI telephone lines. A total of 17,373 strings consisting of people saying the date, time of day, and strings of dollar amounts were used for training.

DB3: The NYNEX PhoneBook database, also distributed by LDC, consists of data collected from a TI telephone line in 8-bit mu-law digital format. 2,341 strings of spontaneously spoken natural numbers, telephone numbers, and dollar amounts were used for training.

DB4: This is a local database consisting of phone numbers spoken over the telephone network as either connected digits or natural numbers. 475 strings were used for training.

DB5: This database consists of natural numbers, date, and time of day strings collected over the U.S. telephone network as part of a data collection effort. 5,562 strings ere used for training.

Of the 39,465 strings used for training, 14,083 strings contain dollar amount data, ,795 strings contain dates, and 2,043 strings contain time of day data. The remaining strings contain digits, phone numbers, and other natural numbers. With this training data, the vocabulary of the a preferred embodiment of a recognizer consisted of 95 words, which are listed in Table 1.

TABLE 1

| Natural Number Vocabulary | |
|---|---|
| zero, oh, one, . . . , nine | AM, PM |
| ten, eleven, . . . , nineteen | January, . . . , December |
| twenty, thirty, . . . , ninety | Sunday, . . . , Saturday |
| first, second, . . . , twelfth | noon, midnight |
| thirteenth, . . . , nineteenth | morning, afternoon |
| twentieth, thirtieth | Evening |
| hundred, thousand | quarter, half |
| dollar, dollars | past, 'til, of |
| cent, cents | in, the |
| and, a, point | next, last, this |

A testing corpus of 5,966 strings from databases DB2, DB3, and DB5 was used for evaluating the performance of the natural number models. Approximately 13% (784 strings) of the data used for evaluation contained noisy data. None of the strings in the testing corpus was used for training the models.

Context Dependent Head-Body-Tail Models

A context dependent subword model set often used to model inter-word dependencies, referred to as head-body-tail (HBT) models, has been used effectively in connected digit recognition. The same context dependency modeling paradigm is used here to capitalize on the high performance achieved by the HBT connected digit models. The choice of HBT modeling also allows us to use a common model set to combine connected digit and natural number recognition. So the HBT model was extended according to the present invention to natural language vocabulary words. Head-body-tail models are a special case of subword modeling where the subword units are not phonetic units that make up a word, but rather, represent the beginning, middle, and end of a word. The center of each word, represented by the body model, is a context independent unit. Context dependency information is incorporated in the head and tail models.

Figure 2:
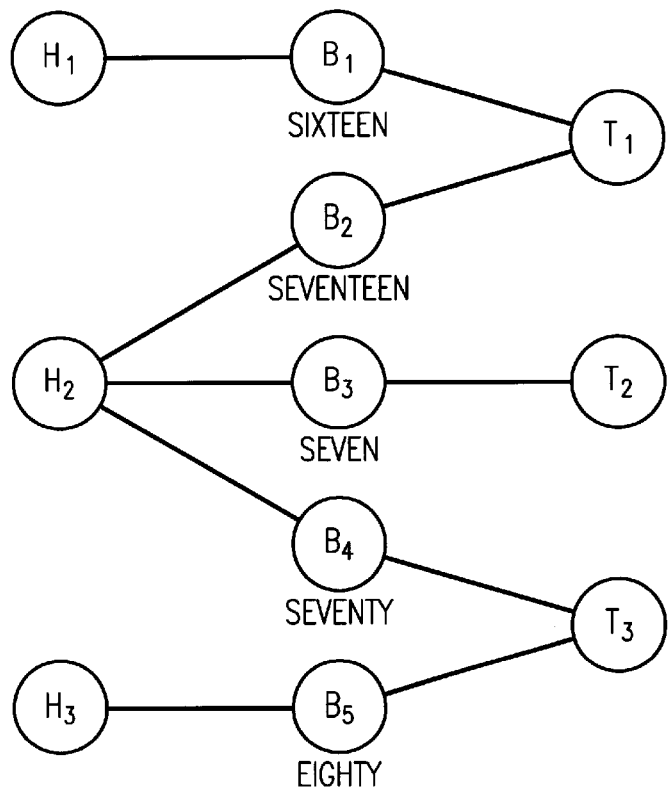
FIGS. 2–5 illustrate the separation of the vocabulary words into a head portion, a body portion and a tail portion and also context sharing for similar sounds and the simplification context sharing provides.
Figure 3:
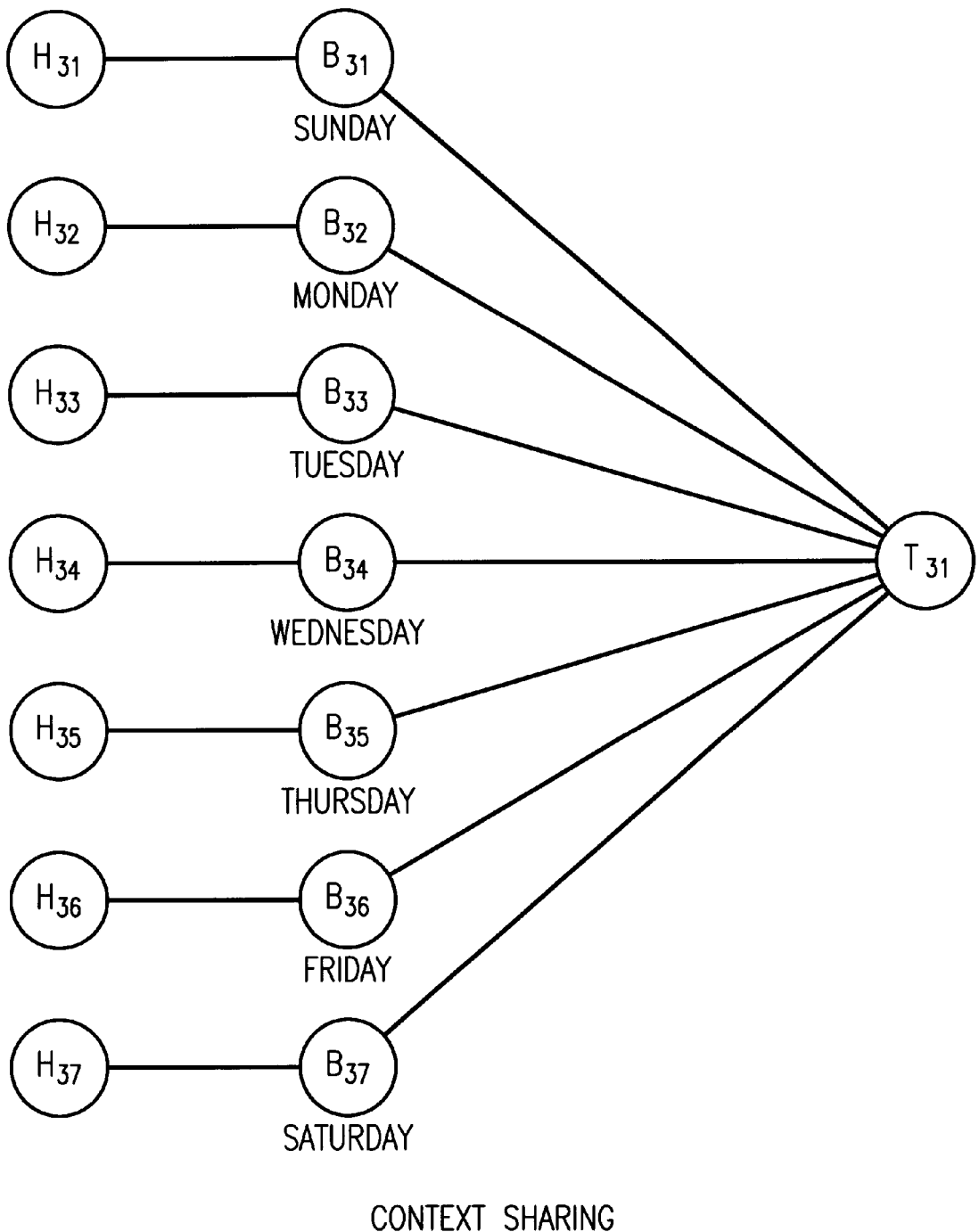
Figure 4:
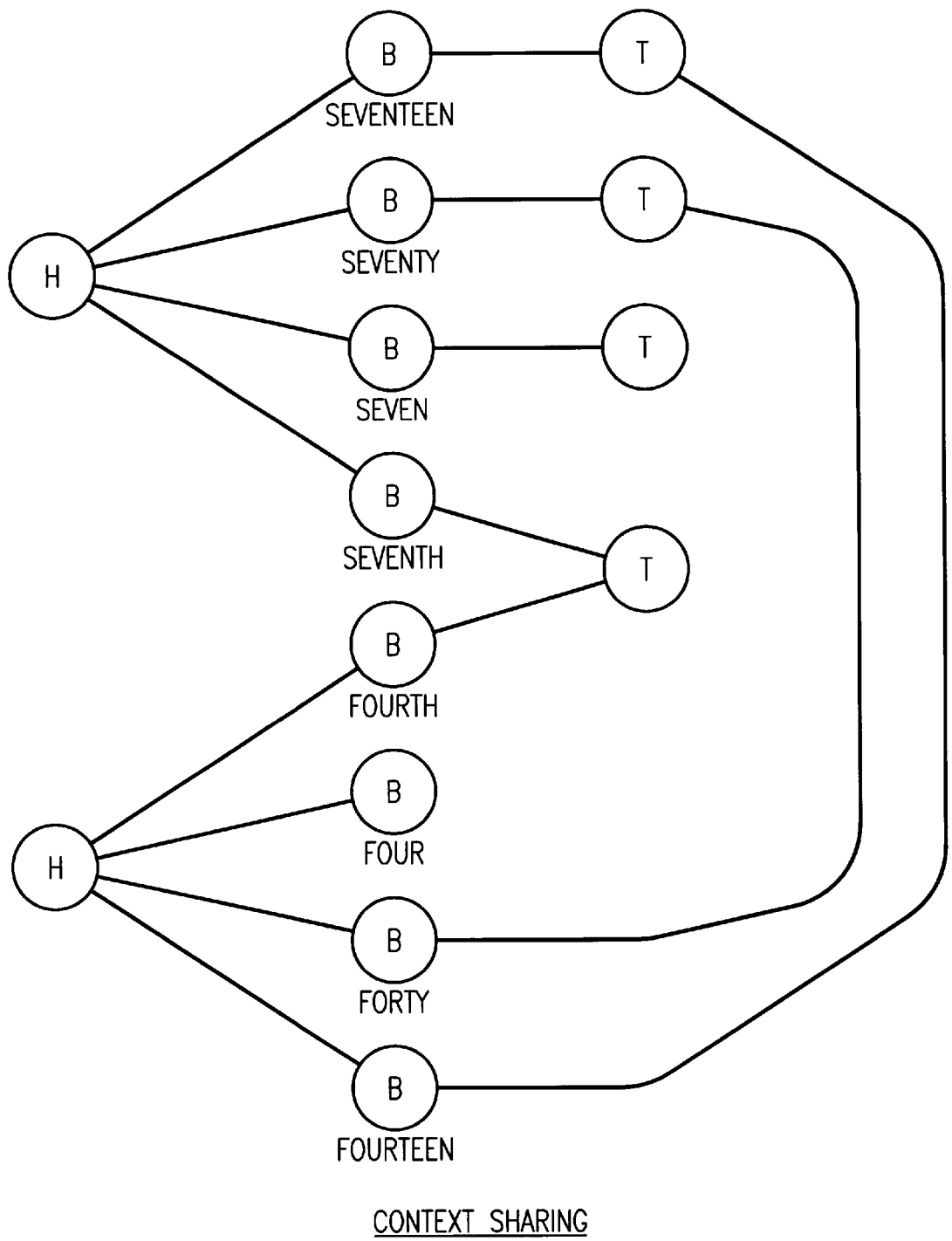
Figure 5:
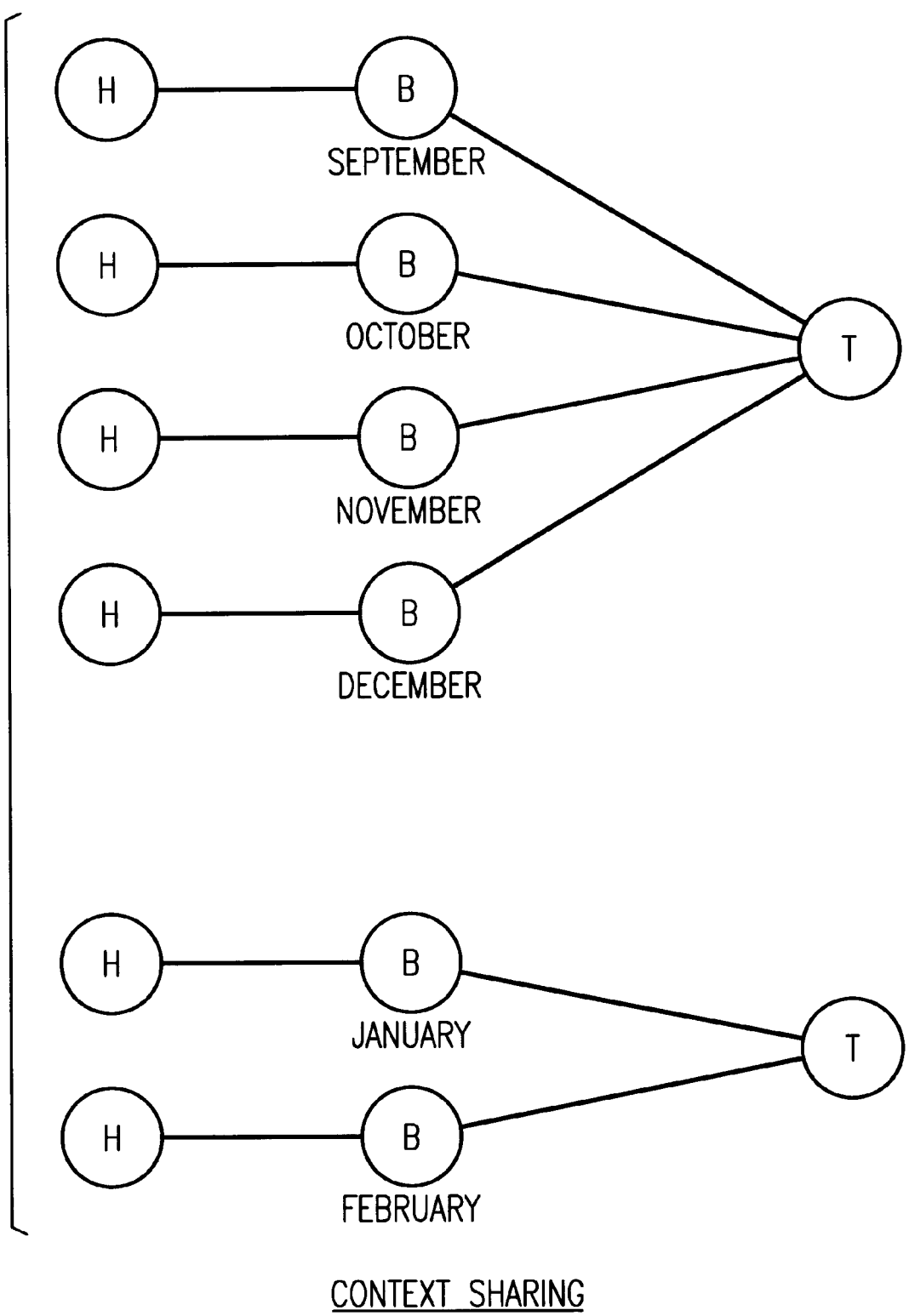

The connected digit HBT model set has a lexicon of 11 words, namely the digits "one" through "nine," "zero" and "oh." In terms of HBT models, this translates into 1 body, 12 head, and 12 tail contexts (11 digits and silence) for each digit, yielding a total of 275 subword units. The natural number lexicon of a preferred embodiment of the present invention described above contains 96 words, including silence. To model all possible HBT contexts would require a large number of models. In addition to the prohibitive storage and computational cost associated with such a large model set, the training data rarely furnishes sufficient instances of each context to support such exhaustive modeling. In order to reduce the model size, most non-number words in the lexicon and the numbers "first," "second," "third," "hundred" and "thousand" are represented by whole-word models as in the context independent case. To further simplify the model set, the notion of shared contexts is used to represent words containing a common stem. For instance, the words "seven," "seventeen" and "seventy" all share a similar initial stem, and could reasonably expected to share the same head contexts, as shown in FIG. 2. The same would be true of words ending with "teen" which could all share the same tail contexts. Similarly, words ending with "ty" share tail contexts, also shown in FIG. 2. The seven days of the week all have the common ending "day" and would therefore share a common tail context, $T_{31}$. FIG. 4 and FIG. 5 provide further illustrations of context sharing for the natural number and scheduling portions of the recognizer vocabulary. The sharing of contexts is done by lexical rules based on these shared sounds and the how the words are used in the specified vocabulary. The lexical rules for shared and not shared contexts within a preferred embodiment of the recognizer vocabulary is shown in Appendix A at the end of the description.

The model set is also reduced during training by using generalized head contexts, each of which lumps together some individual head contexts that are under-represented in the training data set. Likewise, the model set is also reduced by using generalized tail contexts, each of which lumps together some individual tail contexts that are under-represented in the training data set. The total reduction in a model set will depend on the representation of the head portions and tail portions in the training data set used during training. If there is no under represented context in the training data, then there will be no reduction.

This inter-word context dependent model set consists of 58 bodies, 184 heads and 70 tails. The model set also includes 37 whole-word models and a silence model. The context independent body models are represented with 4 states and 16 mixtures per state, while head and tail models are composed of 3 states with 4 mixtures per state. The whole-word models have 10 states with most states containing 8 mixtures per state. The whole-word context independent model set was initially used to bootstrap the context dependent models. Initial bootstrap segmentation for the HBT models was obtained by uniformly dividing the whole-word segments into 10 states to obtain head, body and tail segmentation.

Feature Extraction

The input speech signal is sampled at 8 kHz and passed through a first-order pre- emphasis filter with a coefficient of 0.95. A 30 msec Hamming window with a 10 msec shift is applied, followed by a 10th order linear prediction code (LPC)-derived cepstral analysis. The feature vector consists of 39 features comprised of 12 cepstral coefficients, 12 delta cepstral coefficients, 12 delta-delta cepstral coefficients, normalized log energy, and the delta and delta-delta of the energy. Each cepstral feature is processed using the hierarchical signal bias removal method to reduce effects of channel distortion.

Experimental Results

The performance of the speech recognizer using the HBT model sets was evaluated on three natural number recognition tasks, namely, recognition of time of day, dates, and dollar amounts. Performance between the two training methods was also performed. The string error rate metric was used for evaluating performance.

Since these natural number tasks differ considerably in the vocabulary used, task dependent constraints were imposed during evaluation of performance. These constraints ere defined using a Backus Naur Form (BNF) grammar compiler similar to Brown.

Dollar Amount Recognition

For the dollar amount recognition task, the grammar recognizes any amount between zero and up to, but not including, a million dollars. The amount can be phrased one of the following ways:

a natural number dollar amount followed by a natural number cent amount (e.g., "two hundred and fifty nine dollars and seventy three cents," "a thousand and nineteen dollars," "thirty eight cents") or a connected digits dollar amount followed by a connected digit cent amount (e.g., "two five nine point seven three dollars," "two five nine dollars and seven three cents," "two five nine point seven three").

For the dollar amount recognition task, insertions or deletions of the words "and" and "a," and substitutions between "dollar" and "dollars" and between "cent" and "cents" are not counted as errors since they do not change the meaning of the sentence. Performance of the models on the dollar amount task is shown in Table 2.

TABLE 2

String Error Rate for Dollar Amount (3605 strings)

| Model Set | Baseline ML Trained | MCE Trained | Error Reduction |
| --- | --- | --- | --- |
| CIWW | 13.54% | 8.88% | 34.43% |
| HBT | 10.29% | 7.24% | 29.65% |

It is observed that the MCE trained models reduce the string error rate by up to 34.43% over ML trained models.

Date Recognition

The grammar for date recognition is defined to allow flexibility in the way in which a date is spoken. For example, the date December 2, 1998 can be spoken in some of the following ways:

December two, nineteen ninety eight,

The second of December,

Next Wednesday the second, etc.

For the task of date recognition, substitutions between words such as "fourteen" and "fourteenth" are not counted as errors since they do not change the meaning of the spoken sentence. Table 3 shows the performance of both of the model sets on the date recognition task.

TABLE 3

String Error Rate for Date (1442 strings)

| Model Set | Baseline ML Trained | MCE Trained | Error Reduction |
|---|---|---|---|
| CIWW | 7.63% | 6.80% | 10.91% |
| HBT | 7.07% | 6.31% | 10.78% |

MCE training reduces string error rate by up to 10.91% in the CIWW case. The HBT models give a 7.14% reduction in string error rate over the CIWW models.

Time of Day Recognition

Figure 6:
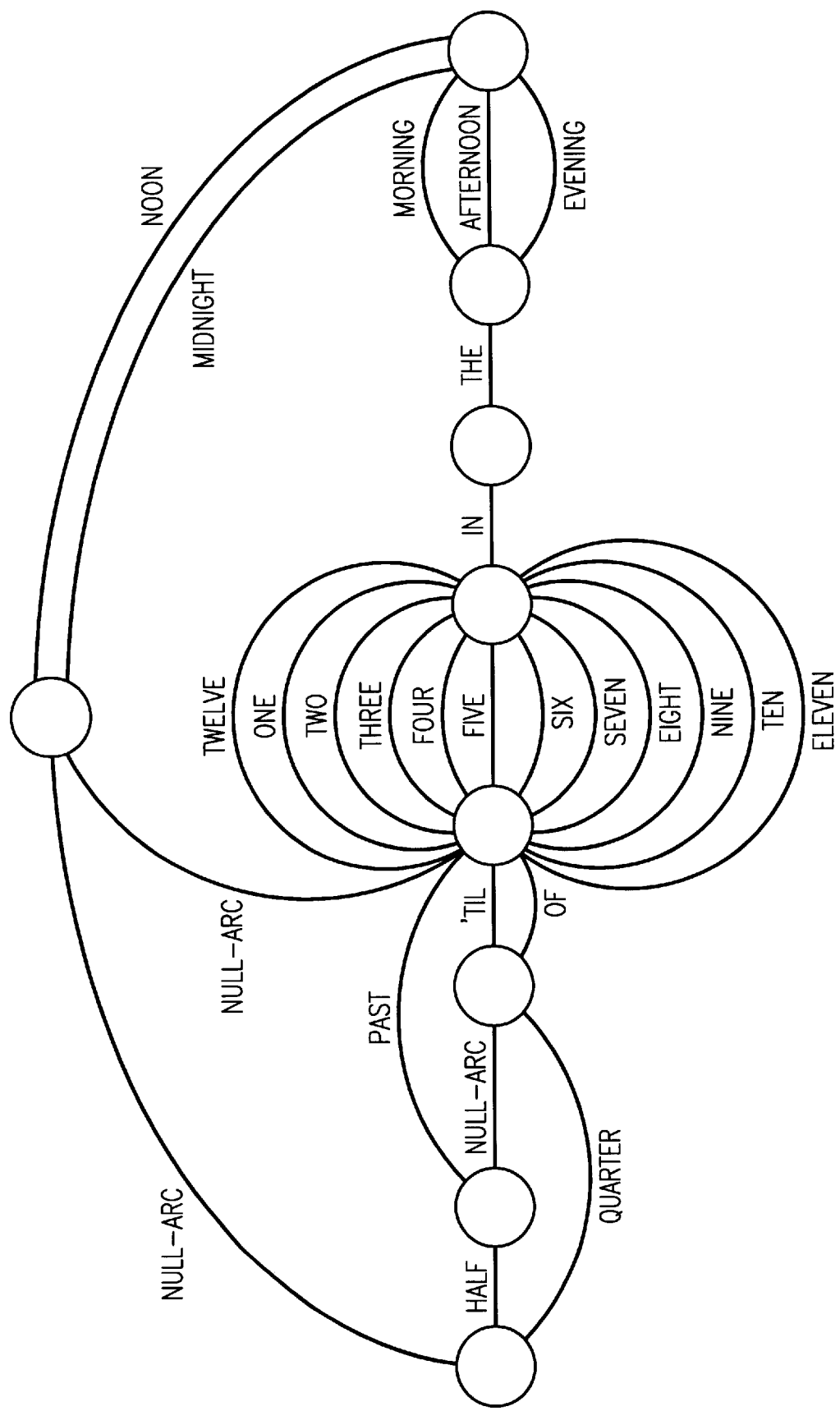
FIG. 6 is a simplified illustration of the operation of a time of day speech recognition method and system.

The grammar for time of day recognition includes all possible times in the 24 hours of a day. FIG. 6 shows a subset of the time of day grammar. For example, the time 12:15 PM can be spoken in some of the following ways:

twelve fifteen p.m., a quarter past noon, or fifteen past twelve in the afternoon, etc.

TABLE 4

String Error Rate for Time of Day (919 strings)

| Model Set | Baseline ML Trained | MCE Trained | Error Reduction |
|---|---|---|---|
| CIWW | 17.85% | 13.93% | 21.95% |
| HBT | 9.14% | 6.96% | 23.81% |

Table 4 shows the performance of the model sets on the time of day recognition task. MCE training reduces string error rate by up to 23.81% in the HBT case. In this task, the HBT models gave a 50% reduction in string error rate over the CIWW models.

The performance on the evaluation data for both of the recognition tasks has demonstrated that MCE training significantly reduces string error rates for all tasks, and that modeling inter-word context dependencies improves performance over context independent whole word models.

Accordingly, a preferred embodiment of the present invention has been presented which has an inter-word context dependent model topology for natural number recognition. The applications considered for evaluation of performance are recognition of dates, the time of day, and spoken dollar amounts. Experimental results indicated that string error rate reductions of up to 50% can be achieved by using inter-word context dependent models over baseline context independent whole-word models. MCE training reduces string error rates by up to 34% over ML trained models. The HBT inter-word context dependent model set gave impressive performance. The methods according to the present invention made it possible for a speech recognition system to accept naturally spoken input of dates, time of day, and dollar amounts with high recognition accuracies of about 93%.

Thus, it will now be understood that there has been disclosed a natural language 20 speech recognition method and system for numerical, monetary and scheduling uses. While the invention has been particularly illustrated and described with reference to preferred embodiments thereof, it will be understood by those skilled in the art that various changes in form, details, and applications may be made therein. For example minor additions or deletions from the vocabulary are possible to meet specific needs, such as time of day in twenty-four hour military natural language. It is accordingly intended that the appended claims shall cover all such changes in form, details and applications which do not depart from the true spirit and scope of the invention.

APPENDIX

| Word | Head | Body | Tail |
|---|---|---|---|
| silence | | # | |
| one | w0 | a0 | z0 |
| two | X0 | b0 | Y0 |
| three | C0 | c0 | D0 |
| four | E0 | d0 | L0 |
| five | N0 | e0 | R0 |
| six | I0 | f0 | J0 |
| seven | G0 | g0 | S0 |
| eight | T0 | h0 | U0 |
| nine | Z0 | i0 | u0 |
| zero | v0 | k0 | y0 |
| oh | O0 | o0 | x0 |
| ten | ?0 | r0 | %0 |
| eleven | =0 | 10 | S0 |
| twelve | s0 | 20 | !0 |
| thirteen | +0 | 30 | [0 |
| fourteen | E0 | 40 | [0 |
| fifteen | F0 | 50 | [0 |
| sixteen | I0 | 60 | [0 |
| seventeen | G0 | 70 | [0 |
| eighteen | T0 | 80 | [0 |
| nineteen | Z0 | 90 | [0 |
| twenty | s0 | Q0 | ]0 |
| thirty | +0 | V0 | ]0 |
| forty | E0 | W0 | ]0 |
| fifty | F0 | j0 | ]0 |
| sixty | I0 | 10 | ]0 |
| seventy | G0 | n0 | ]0 |
| eighty | T0 | p0 | ]0 |
| ninety | Z0 | q0 | ]0 |
| dollars | | Dollars | |
| dollar | | Dollar | |
| cents | | Cents | |
| cent | | Cent | |
| and | | And | |
| a | | A | |
| point | | Point | |
| hundred | | Hun | |
| thousand | | Thou | |
| january | | Jan | |
| february | | Feb | |
| march | | Mar | |
| april | | Apr | |
| may | | May | |
| june | | Jun | |
| july | | Jul | |
| august | | Aug | |
| september | sepH | Sep | ber |
| october | octH | Oct | ber |
| november | novH | Nov | ber |
| december | decH | Dec | ber |
| sunday | sunH | Sun | day |
| monday | monH | Mon | day |
| tuesday | tueH | Tue | day |
| wednesday | wedH | Wed | day |
| thursday | thuH | Thu | day |
| friday | friH | Fri | day |
| saturday | satH | Sat | day |
| first | | 1t | |
| second | | 2t | |
| third | | 3t | |
| fourth | E0 | 4t | ]1 |
| fifth | F0 | 5t | ]1 |
| sixth | I0 | 6t | ]1 |
| seventh | G0 | 7t | ]1 |
| eighth | T0 | 8t | ]1 |
| ninth | Z0 | 9t | ]1 |
| tenth | ?0 | 10t | ]1 |
| eleventh | =0 | 11t | ]1 |
| twelfth | s0 | 12t | ]1 |
| thirteenth | +0 | 13t | ]2 |

APPENDIX-continued

| | | | |
|---|---|---|---|
| fourteenth | E0 | 14t | J2 |
| fifteenth | F0 | 15t | J2 |
| sixteenth | I0 | 16t | J2 |
| seventeenth | G0 | 17t | J2 |
| eighteenth | T0 | 18t | J2 |
| nineteenth | Z0 | 19t | J2 |
| twentieth | s0 | 20t | J3 |
| thirtieth | +0 | 30t | J3 |
| last | | Last | |
| next | | Next | |
| of | | Of | |
| the | | The | |
| this | | This | |
| AM | | AM | |
| PM | | PM | |
| afternoon | | Afternoon | |
| evening | | Evening | |
| half | | Half | |
| in | | In | |
| midnight | | Midnight | |
| morning | | Morning | |
| noon | | Noon | |
| past | | Past | |
| quarter | | Quarter | |
| till | | Till | |

What is claimed is:

1. A method for automatic speech recognition comprising the steps of:
   building a model for a vocabulary of sounds wherein at least two sounds share a common head or a common tail;
   wherein said vocabulary of sounds includes subwords;
   receiving an utterance containing at least one word;
   processing the utterance into cepstral coefficients; and
   recognizing at least one word in the utterance using said model.

2. The method of claim 1, wherein said vocabulary of sounds includes models of words, each model consisting of a head, body, and tail portion.

3. The method of claim 1, wherein said vocabulary includes time of day words.

4. The method of claim 1, wherein said model includes digit words 'zero', 'oh', 'one', 'two', 'three', 'four', 'five', 'six', 'seven', 'eight', and 'nine'.

5. The method of claim 4, wherein said model also includes numbers 'ten,' and larger.

6. The method of claim 1, wherein said model includes months of the year, 'January' through 'December.'

7. The method of claim 6, where months with similar endings share common tail models.

8. The method of claim 1, wherein said model of sounds includes numbers.

9. The method of claim 8, wherein numbers with similar endings share tail models.

10. The method of claim 8, wherein numbers with similar beginnings share head models.

11. The method of claim 1, wherein said model includes days of the week, 'Monday' through 'Friday.'

12. The method of claim 11, wherein said models for days of the week share contexts for the 'day' portion of the word.

13. A method for automatic speech recognition comprising the steps of:
    receiving an utterance containing at least one word of a vocabulary of words;
    processing the utterance into cepstral coefficients;
    separating the utterance into a plurality of words;
    separating at least one of said plurality of words into a head portion, a body portion and a tail portion;
    recognizing at least one word from the vocabulary using said head portion, said body portion and said tail portion.

14. The method of claim 13, wherein said vocabulary includes group of time of day words.

15. The method of claim 14, wherein said vocabulary includes digit words 'zero', 'oh', 'one', 'two', 'three', 'four', 'five', 'six', 'seven', 'eight', and 'nine'.

16. The method of claim 13, wherein said vocabulary includes digit words 'zero', 'oh', 'one', 'two', 'three', 'four', 'five', 'six', 'seven', 'eight', and 'nine'.

17. A method for automatic speech recognition comprising the steps of:
    receiving an utterance containing at least one digit word and at least one non-digit word;
    processing the utterance into cepstral coefficients;
    separating the utterance into a plurality of words;
    separating at least one of said plurality of words into a head portion, a body portion and a tail portion;
    recognizing said at least one word using a vocabulary for numbers, dates and times of day.

18. The method of claim 17, wherein for the pronunciation of numbers less than one million, (unless the word million is included in the vocabulary) said plurality of contexts includes:
    a shared context of numbers ending in letters 'teen'
    a shared context of numbers ending in letters 'ty', and
    a shared context of numbers beginning in letters 'seven'.

19. The method of claim 17, wherein for scheduling said plurality of contexts includes:
    a shared context of months ending in letters 'ber'
    a shared context of days of the week ending in the letters 'day'
    a shared context of numbers ending in letters 'teen'
    a shared context of numbers ending in letters 'ty', and
    a shared context of numbers beginning in letters 'seven'.

20. The method of claim 17, wherein said vocabulary words comprise spoken numbers.

21. The method of claim 17, wherein said vocabulary words comprise spoken dates.

22. The method of claim 17, wherein said vocabulary words comprise spoken times.

* * * * *